United States Patent
Barbat et al.

(10) Patent No.: US 9,327,665 B2
(45) Date of Patent: May 3, 2016

(54) ENERGY ABSORBING APPARATUS FOR A BUMPER RAIL

(71) Applicant: Ford Global Technologies, LLC, Dearborn, MI (US)

(72) Inventors: Saeed David Barbat, Novi, MI (US); Mohamed Ridha Baccouche, Ann Arbor, MI (US); Rahul Arora, Royal Oak, MI (US); Saied Nusier, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/585,644

(22) Filed: Dec. 30, 2014

(65) Prior Publication Data

US 2015/0108776 A1 Apr. 23, 2015

Related U.S. Application Data

(62) Division of application No. 13/967,617, filed on Aug. 15, 2013, now Pat. No. 8,939,480.

(51) Int. Cl.
*B60R 19/34* (2006.01)
*B60R 19/36* (2006.01)
*B60R 19/18* (2006.01)

(52) U.S. Cl.
CPC ............... *B60R 19/34* (2013.01); *B60R 19/36* (2013.01); *B60R 2019/186* (2013.01)

(58) Field of Classification Search
CPC .. B60R 19/34; B60R 19/18; B60R 2019/186; B60R 21/34; B60R 21/0136; F16F 7/12
USPC ................. 293/133, 102, 120, 121, 132, 155; 188/371, 377; 296/187.09; 180/274
See application file for complete search history.

(56) References Cited

U.S. PATENT DOCUMENTS

| | | | | |
|---|---|---|---|---|
| 5,431,445 A | * | 7/1995 | Wheatley | B62D 21/152 188/377 |
| 5,876,077 A | * | 3/1999 | Miskech | B60R 19/18 293/132 |
| 6,672,438 B2 | * | 1/2004 | Beck | B60R 19/34 188/377 |
| 6,808,215 B2 | * | 10/2004 | Sakuma | B60R 19/34 293/102 |
| 6,820,924 B2 | * | 11/2004 | Caliskan | B62D 21/15 188/377 |
| 7,213,867 B2 | * | 5/2007 | Haneda | F16F 7/12 188/377 |
| 7,290,811 B1 | | 11/2007 | Arns | |
| 7,389,860 B2 | * | 6/2008 | Abu-Odeh | B62D 21/15 188/376 |
| 7,677,617 B2 | * | 3/2010 | Stewart | B60R 19/34 293/133 |
| 7,695,052 B2 | * | 4/2010 | Nusier | B62D 21/152 293/133 |
| 7,862,104 B2 | * | 1/2011 | Kano | B60R 19/34 296/187.03 |
| 7,896,411 B2 | * | 3/2011 | Kano | F16F 7/12 293/133 |
| 7,926,865 B2 | * | 4/2011 | Terada | B60R 19/34 296/132 |
| 8,210,601 B2 | | 7/2012 | Terada et al. | |

(Continued)

*Primary Examiner* — Kiran B Patel
(74) *Attorney, Agent, or Firm* — Jason Rogers; Brooks Kushman P.C.

(57) ABSTRACT

A collision energy absorption apparatus and a vehicle front end structure including the apparatus. The apparatus is welded to a bumper beam and is laterally adjacent a longitudinally extending member disposed behind the bumper beam. The apparatus has a central body having a front edge attached to the bumper beam and a rear edge that is spaced from the bumper beam and the longitudinally extending member. Upper and lower triangular walls extend between the central body and the longitudinally extending member. A rib extends laterally outwardly from the central body.

15 Claims, 3 Drawing Sheets

(56) References Cited

U.S. PATENT DOCUMENTS

| | | | | |
|---|---|---|---|---|
| 8,231,155 B2* | 7/2012 | Arns | B60R 19/34 293/102 |
| 2006/0237976 A1* | 10/2006 | Glasgow | B21C 37/158 293/132 |
| 2007/0181393 A1* | 8/2007 | Suzuki | F16F 7/12 188/377 |
| 2008/0106107 A1* | 5/2008 | Tan | B60R 19/34 293/133 |
| 2010/0127531 A1* | 5/2010 | Yasuhara | B62D 21/152 296/187.09 |
| 2010/0164238 A1* | 7/2010 | Nakanishi | F16F 7/12 293/132 |
| 2011/0015902 A1* | 1/2011 | Cheng | B62D 21/152 703/1 |
| 2011/0049916 A1* | 3/2011 | Nakanishi | B60R 19/34 293/133 |
| 2011/0241385 A1 | 10/2011 | Baccouche et al. | |
| 2013/0300138 A1* | 11/2013 | Banasiak | B60R 19/34 293/133 |
| 2014/0203577 A1* | 7/2014 | Nagwanshi | B60R 19/34 293/120 |
| 2014/0217777 A1* | 8/2014 | Tanaka | B62D 25/20 296/187.09 |
| 2014/0284948 A1* | 9/2014 | Hoschouer | B60R 19/34 293/133 |

* cited by examiner

ENERGY ABSORBING APPARATUS FOR A BUMPER RAIL

CROSS-REFERENCE TO RELATED APPLICATION

This application is a division of U.S. application Ser. No. 13/967,617 filed Aug. 15, 2013, the disclosure of which is hereby incorporated in its entirety by reference herein.

TECHNICAL FIELD

This disclosure relates to an energy absorbing apparatus for a vehicle that is involved in a small offset rigid barrier frontal collision.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provide the primary support for the vehicle body and reduce any potential for intrusions into the passenger compartment. The extent of any intrusions into the passenger compartment are measured at the brake pedal, foot rest, left toe pan, center toe pan, right toe pan, left instrument panel, right instrument panel, and door.

A new test is proposed for simulating small offset frontal collisions against a rigid barrier. In the proposed test, the vehicle impacts a rigid barrier having a six inch pole-like radius on one corner with a 25% overlap at 40 MPH. The impact is outboard of the frame rails so that the frame rails do not provide as much resistance to intrusion into the passenger compartment as in the case of impacts between the frame rails.

The weight of land vehicles is being substantially reduced to improve fuel efficiency. Vehicles are currently being designed to reduce the weight of the vehicle with a parallel objective of not compromising performance or crashworthiness. It is difficult to meet the proposed test requirements for the small offset rigid barrier crash test while reducing vehicle weight and reducing manufacturing costs.

The above problems and other problems are addressed by this disclosure as will be summarized below.

SUMMARY

According to one aspect of this disclosure, an energy absorbing apparatus comprising an attachment to an energy absorbing assembly is disclosed for a vehicle having a bumper rail. The apparatus includes a central body that is planar in shape and is attached to the bumper rail with a leading edge of the central body contacting the bumper rail and a trailing edge of the central body being spaced from the bumper rail. A first wall extends from a first edge of the central body to a longitudinally extending structural member backing the bumper rail. A second wall extends from a second edge of the central body to the longitudinally extending structural member backing the bumper rail. A rib extends from the central body away from the structural member.

According to other aspects of this disclosure relating to the apparatus, the rib may be widest adjacent the leading edge and is narrowest at the trailing edge. The first and second walls may be narrowest adjacent the leading edge and are widest at the trailing edge. The longitudinally extending structural member may be a crush can disposed rearward of the bumper rail and forward of a frame rail of the vehicle. The rib may be a roll bonded double thickness of a sheet of metal that is welded or otherwise attached to extend from the central body. The rib may have a trapezoidal shape. The first wall and second wall may be triangular. A force from a collision of the vehicle with an object disposed outboard of the longitudinally extending structural member is applied to the rib, then to the central body, then to the first leg and the second leg, and then to the longitudinally extending structural member.

According to another aspect of this disclosure, a collision absorbing assembly is disclosed for a land vehicle. The land vehicle comprises a bumper beam disposed at the front end of the vehicle, one or more crush cans are disposed rearward of the bumper beam, and a frame assembly of the vehicle disposed rearward of the crush cans. An impact absorbing attachment is attached to the bumper beam and contacts a lateral side of one of the crush cans. The impact absorbing apparatus includes a central body that is planar in shape and attached to the bumper beam with a leading edge of the central body contacting the bumper beam and a trailing edge of the central body being spaced from the bumper beam. A first wall and a second wall extend from a first and a second edge of the central body, respectively, and to one of the crush cans. A rib is attached to the central body to extend from the central body away from the one crush can.

According to other aspects of this disclosure relating to the collision absorbing assembly, a bracket may be disposed between the frame assembly and the crush cans and the trailing edge of the central body is spaced from the bracket. The collision absorbing attachment may be welded to the bumper beam and may contact the front end of the crush can adjacent the bumper beam, but is not otherwise attached to the crush can.

The above aspects and other aspects of this disclosure will be described in greater detail below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
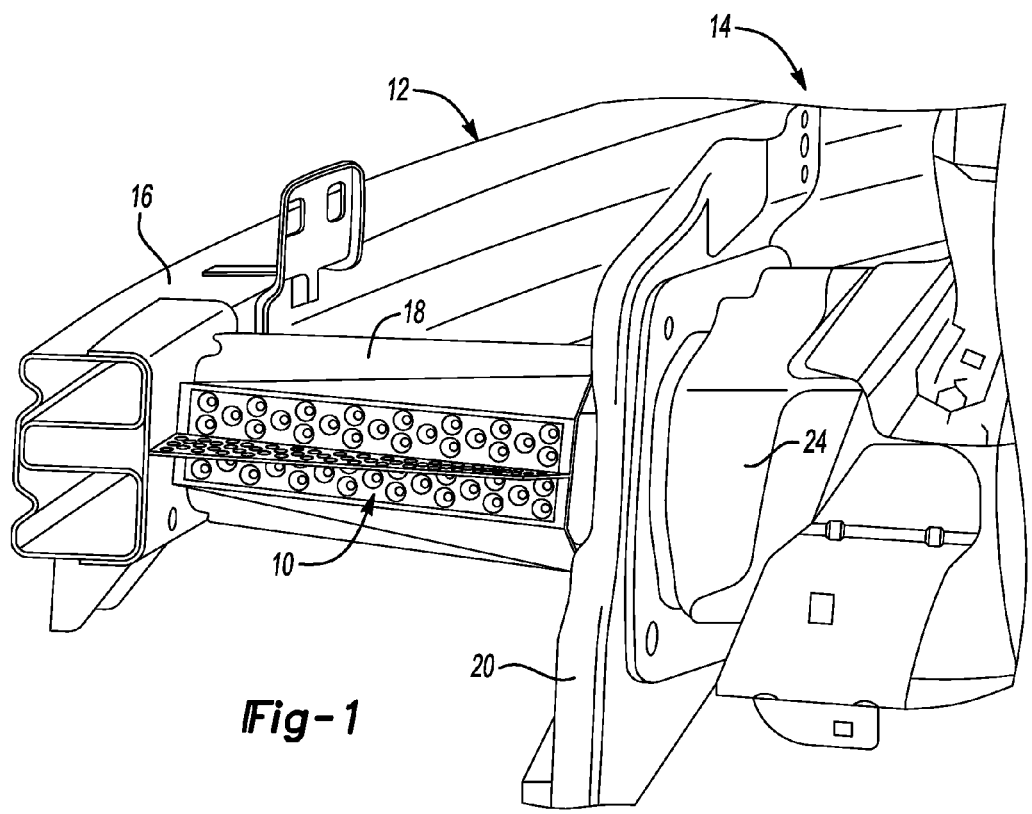
FIG. 1 is a fragmentary perspective view of a vehicle front end showing an example of a collision energy absorption apparatus.
Figure 2:
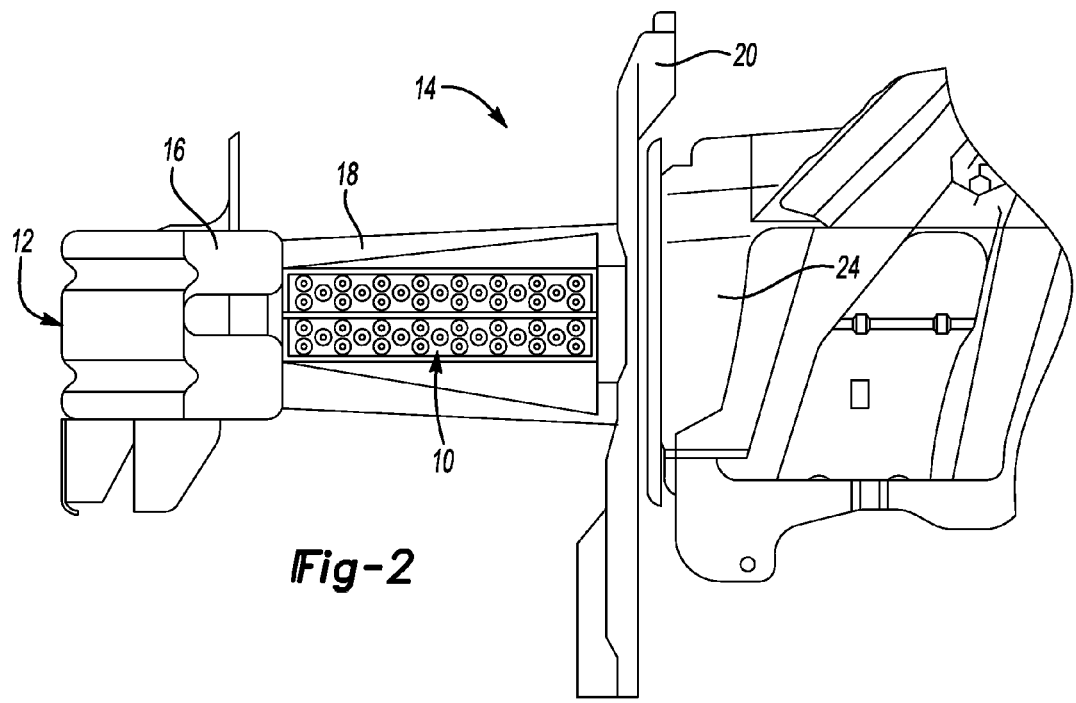
FIG. 2 is a fragmentary side elevation view of the vehicle front end and collision energy absorption apparatus illustrated in FIG. 1.

Referring to FIGS. 1 and 2, an energy absorbing apparatus 10 is disposed in the front end 12 of a vehicle 14 that is partially depicted. A bumper beam 16 is provided at the front end 12 of the vehicle 14. A crush can 18 is assembled between the bumper beam 16 and a bracket 20. The bracket 20 is interposed between the crush can 18 and a frame rail 24. The energy absorbing apparatus 10 is welded to the bumper beam 16 and is spaced from the bracket 20. The crush can 18 is designed to absorb energy in the event of a front end collision. The energy absorbing apparatus 10 provides additional protection against collision with the bumper beam 16 outboard of the frame rail 24.

Figure 3:
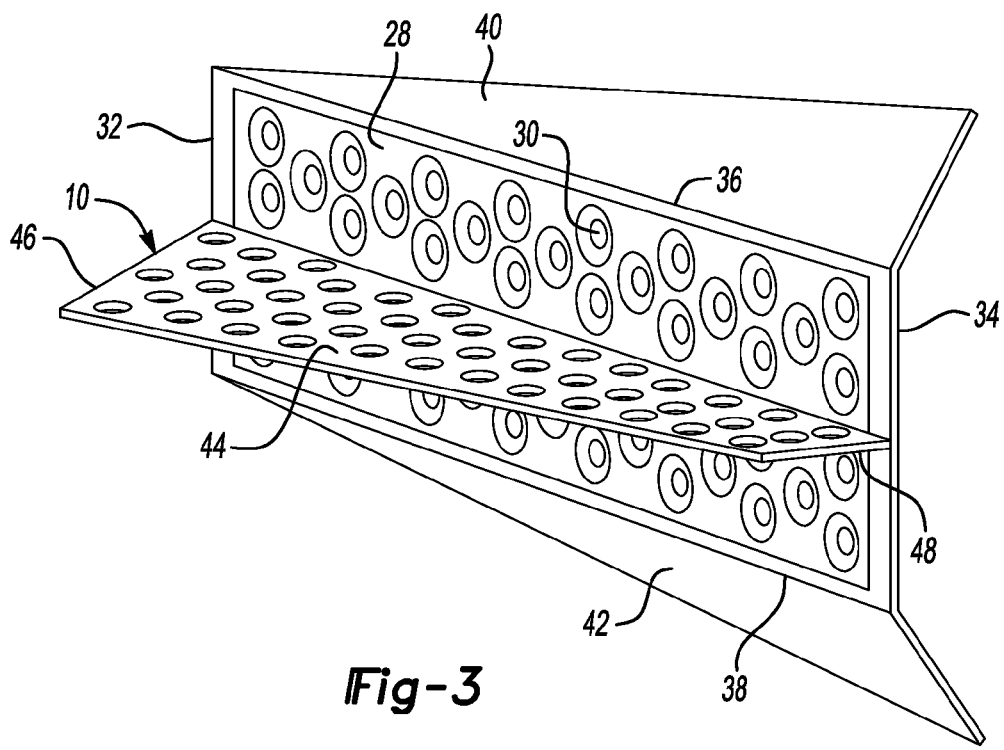
FIG. 3 is a side/rear perspective view of the collision energy absorption apparatus illustrated in FIG. 1.

Referring to FIG. 3, the structure of one embodiment of the energy absorbing apparatus 10 is described. The energy absorbing apparatus 10 includes a central body 28 that may be manufactured as a regular stamped part or may be formed by pressure roll bonding aluminum. The pressure bonded aluminum allows two thin aluminum sheets to be bonded together to add stiffness and achieve weight savings. The roll bonded, double thickness of aluminum sheet includes a plurality of circular indentations 30 that provide higher section stiffness and a higher buckling load. The higher buckling load allows the energy absorption apparatus 10 to withstand higher stresses and transfer higher crash loads to the main crush can 18 (shown in FIGS. 1 and 2) prior to buckling. Each aluminum sheet may be about 1 mm thick and is mated by the indentations 30 to a mirror image sheet in the roll bonding process.

The central body 28 has a leading edge 32 that is welded to the bumper 16 (shown in FIGS. 1 and 2). The leading edge 32 of the energy absorbing apparatus 10 is also located adjacent to the crush can 18 (shown in FIGS. 1 and 2). A trailing edge 34 of the energy absorbing apparatus 10 is spaced from the bumper beam 16 and also spaced from the crush can 18. An upper edge 36, or first edge, of the central body 28 extends from the leading edge 32 to the trailing edge 34. A lower edge 38, or second edge, of the central body 28 also extends from the leading edge 32 to the trailing edge 34. A first wall 40, or upper wall, and a second wall 42, or lower wall, extend from the upper edge 36 and lower edge 38 of the central body 28, respectively, to the crush can 18.

Figure 4:
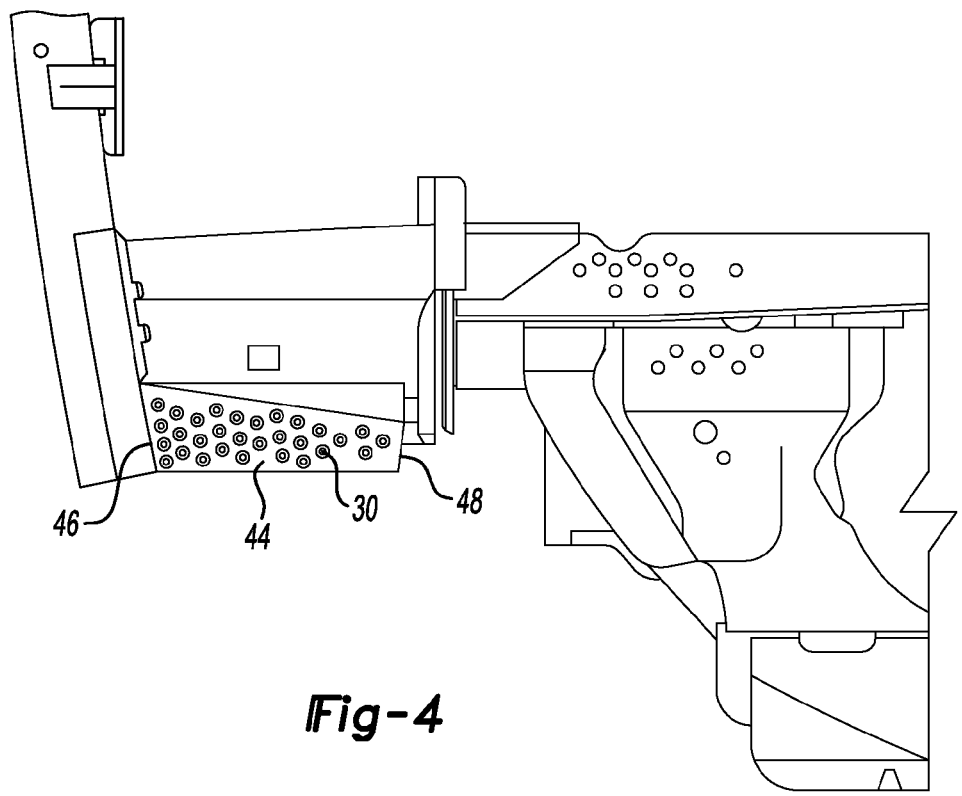
FIG. 4 is a fragmentary plan view of the vehicle front end and collision energy absorption apparatus illustrated in FIG. 1.

Referring to FIGS. 3 and 4, a lateral rib 44 that is wider at its front edge 46 adjacent to the bumper beam than at the rear edge 48 that is adjacent the trailing edge 34 of the central body 28. The lateral rib 44 may be made with a pressure roll bond process in which two aluminum sheets are bonded together to provide greater stiffness and buckling resistance while being lighter in weight than a single thicker sheet of aluminum. The rib alternatively may be made in a conventional stamping operation. The lateral rib 44 may be welded or otherwise attached to the central portion 28. The lateral rib 44 alternatively may be formed as a flange of the central portion 28.

Figure 5:
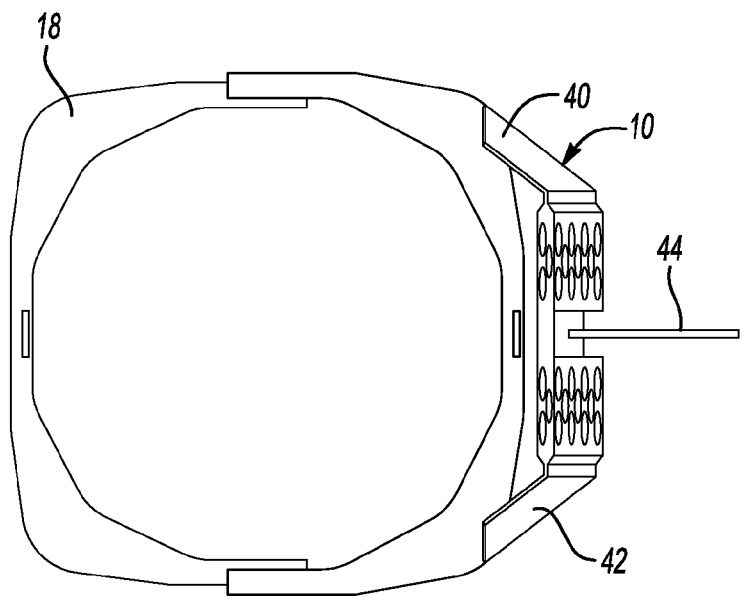
FIG. 5 is a front elevation view of the collision energy absorption apparatus illustrated in FIG. 1 attached to a crush can.
Figure 6:
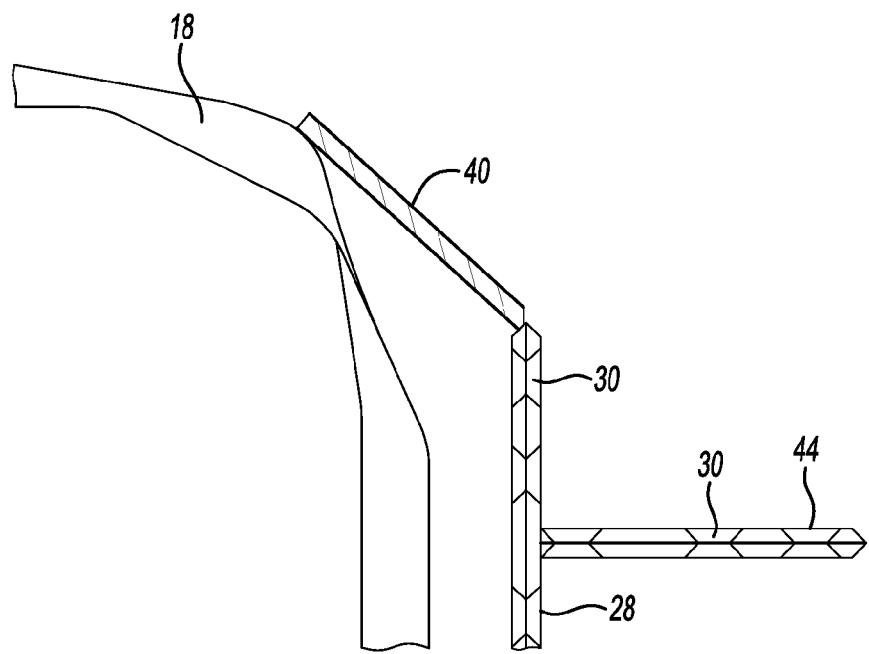
FIG. 6 is a fragmentary cross-sectional view of the collision energy absorption apparatus attached to a crush can.

Referring to FIGS. 5 and 6, a crush can 18 is illustrated that is a generally octagonal shaped member that extends longitudinally rearward of the bumper beam 16 (shown in FIGS. 1 and 2). The energy absorbing apparatus 10 is shown to be retained in a spaced relationship relative to the crush can 18 by the first wall 40 and second wall 42. The lateral rib 44 extends in the outboard direction and away from the crush can 18.

In the event of a collision with an object outboard of the frame rail 24 (shown in FIGS. 1, 2 and 4), the bumper beam 16 is initially contacted and driven into the front edge 46 of the rib 44. The rib transfers a portion of the energy from the impact to the central portion 28 and is driven toward the side of the crush can 18. The first wall 40 and second wall 42 spread apart as the central portion 28 is driven toward the crush can 18. The central portion 28 is driven into engagement with the crush can 18 and applies a lateral load to the crush can 18 driving the crush can 18 inboard and absorbing a portion of the collision energy. The walls 40, 42 are spread apart as the central portion 28 is flattened against the crush can 18. The crush can 18 is connected to the bracket 20. The bracket 20 is connected to the frame rail 24 so that energy initially exerted outboard of the frame rail 24 is redirected by the energy absorbing apparatus 10, to the crush can 18, the bracket 20, and frame rail 24.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An energy absorbing apparatus for a vehicle having a bumper beam comprising:
    a central body that is planar in shape and attachable to the bumper beam with a leading edge of the central body contacting the bumper beam and a trailing edge of the central body spaced from the bumper beam;
    a first wall extending from a first edge of the central body to a longitudinally extending structural member backing the bumper beam;
    a second wall extending from a second edge of the central body to the longitudinally extending structural member backing the bumper beam; and
    a rib extending from the central body away from the structural member.

2. The energy absorbing apparatus of claim 1 wherein the rib is widest adjacent the leading edge and is narrowest at the trailing edge.

3. The energy absorbing apparatus of claim 1 wherein the first wall and second wall are narrowest adjacent the leading edge and are widest at the trailing edge.

4. The energy absorbing apparatus of claim 1 wherein the longitudinally extending structural member is a crush can disposed rearward of the bumper beam and forward of a frame rail of the vehicle.

5. The energy absorbing apparatus of claim 1 wherein the rib is a roll bonded double thickness of metal that is attached to the central body.

6. The energy absorbing apparatus of claim 1 wherein the rib has a trapezoidal shape and the first wall and second wall are triangular.

7. The energy absorbing apparatus of claim 1 wherein a force from a collision of the vehicle with an object disposed outboard of the energy absorbing apparatus is transferred from the bumper beam to the rib, then to the central body, then to the first wall and the second wall, and then to the longitudinally extending member.

8. An energy absorbing apparatus comprising:
    a planar body with a leading edge attached adjacent to a bumper beam and a trailing edge spaced from the bumper beam;
    a first wall extending from a first edge of the body to a longitudinally extending structural member backing the bumper beam;

a second wall extending from a second edge of the body to the structural member; and a rib extending from the body away from the structural member.

9. The energy absorbing apparatus of claim 8 further comprising a bracket disposed between a frame assembly and a crush can, and wherein the trailing edge of the planar body is spaced from the bracket.

10. The energy absorbing apparatus of claim 8 wherein the energy absorbing apparatus is welded to the bumper beam and contacts a crush can adjacent the bumper beam and is not otherwise attached to the crush can.

11. The energy absorbing apparatus of claim 8 wherein the rib is widest adjacent the leading edge and is narrowest at the trailing edge.

12. The energy absorbing apparatus of claim 8 wherein the first wall and second wall are narrowest adjacent the leading edge and are widest at the trailing edge.

13. The energy absorbing apparatus of claim 8 wherein the rib is a roll bonded double thickness of metal that is attached to the planar body.

14. The energy absorbing apparatus of claim 8 wherein the rib has a trapezoidal shape and the first wall and second wall are triangular.

15. The energy absorbing apparatus of claim 8 wherein a force from a collision with an object disposed outboard of the energy absorbing apparatus is transferred from the bumper beam to the rib, then to the planar body, then to the first wall and the second wall, and then to a crush can.

\* \* \* \* \*